US012682422B2

(12) United States Patent
Yang et al.

(10) Patent No.: US 12,682,422 B2
(45) Date of Patent: Jul. 14, 2026

(54) METHOD AND DEVICE FOR CORRECTING MAGNETIC RESONANCE IMAGE, STORAGE MEDIUM, AND TERMINAL

(71) Applicant: Beijing Chao-Yang Hospital, Capital Medical University, Beijing (CN)

(72) Inventors: Qi Yang, Beijing (CN); Yueyan Bian, Beijing (CN); Xiuqin Jia, Beijing (CN)

(73) Assignee: BEIJING CHAO-YANG HOSPITAL, CAPITAL MEDICAL UNIVERSITY, Beijing (CN)

( * ) Notice: Subject to any disclaimer, the term of this patent is extended or adjusted under 35 U.S.C. 154(b) by 245 days.

(21) Appl. No.: 18/624,394

(22) Filed: Apr. 2, 2024

(65) Prior Publication Data

US 2024/0346623 A1     Oct. 17, 2024

(30) Foreign Application Priority Data

Apr. 14, 2023     (CN) .......................... 202310395967.3

(51) Int. Cl.
*G06T 5/20*          (2006.01)
*G06T 7/33*          (2017.01)
*G06V 10/26*         (2022.01)

(52) U.S. Cl.
CPC ................ *G06T 5/20* (2013.01); *G06T 7/337* (2017.01); *G06V 10/26* (2022.01);
(Continued)

(58) Field of Classification Search
CPC . G06T 5/20; G06T 7/337; G06T 2207/10016; G06T 2207/10088; G06T 2207/30004; G06V 10/26; G06V 2201/03
See application file for complete search history.

(56) References Cited

U.S. PATENT DOCUMENTS

2009/0267603 A1    10/2009  Yanasak
2016/0310761 A1*   10/2016  Li ........................ A61N 5/1039
(Continued)

FOREIGN PATENT DOCUMENTS

CN          104095635 A     10/2014
CN          108132274 A     6/2018
(Continued)

OTHER PUBLICATIONS

First Office Action dated May 13, 2023 received in Chinese patent Application No. 202310395967.3.
(Continued)

*Primary Examiner* — John W Miller
(74) *Attorney, Agent, or Firm* — Scully, Scott, Murphy & Presser, P.C.

(57) ABSTRACT

A method and a device for correcting magnetic resonance images are provided. The method includes: acquiring an ADC image to be corrected, which is generated by scanning a target object using an echo planar imaging sequence from a pulse sequence of a portable mobile magnetic resonance apparatus and converting; inputting the ADC image to be corrected into a pre-constructed image correction model to correct a grayscale value of tissue position of the ADC image to be corrected, where the pre-constructed image correction model is generated by function fitting based on magnetic resonance image sequences of different objects; and outputting a target image corresponding to the ADC image to be corrected. A storage medium and a terminal are also provided.

8 Claims, 2 Drawing Sheets

(52) U.S. Cl.
CPC ............... *G06T 2207/10016* (2013.01); *G06T*
*2207/10088* (2013.01); *G06T 2207/30004*
(2013.01); *G06V 2201/03* (2022.01)

(56) References Cited

U.S. PATENT DOCUMENTS

| | | | | |
|---|---|---|---|---|
| 2017/0301095 A1* | 10/2017 | Zhang | ........................ | G06T 5/70 |
| 2022/0230310 A1* | 7/2022 | Xie | ............................ | G06T 7/12 |
| 2022/0375086 A1* | 11/2022 | Katada | ....................... | G06T 5/92 |
| 2024/0104705 A1* | 3/2024 | Zhao | ......................... | G06T 7/11 |
| 2024/0153163 A1* | 5/2024 | Lenga | ................... | G06T 7/0012 |
| 2024/0249395 A1* | 7/2024 | Datta | ................. | G01R 33/5608 |
| 2024/0394836 A1* | 11/2024 | Ren | ...................... | G06N 3/0464 |

FOREIGN PATENT DOCUMENTS

| | | | |
|---|---|---|---|
| CN | 113835059 A | 12/2021 | |
| CN | 115236576 A | 10/2022 | |

OTHER PUBLICATIONS

Yuen, M. et al., "Portable, low-field magnetic resonance imaging
enables highly accessible and dynamic bedside evaluation of isch-
emic stroke", Sci. Adv., Apr. 2022, pp. 1-10, vol. 8.
Jiang, J. et al., "B1-corrected T1 mapping for measuring lung cancer
native T1 value and correlations with apparent diffusion coefficient
and Ki-67 expression", Chin J Med Imaging Technol, 2022, pp.
1652-1656, vol. 38, No. 11.

* cited by examiner

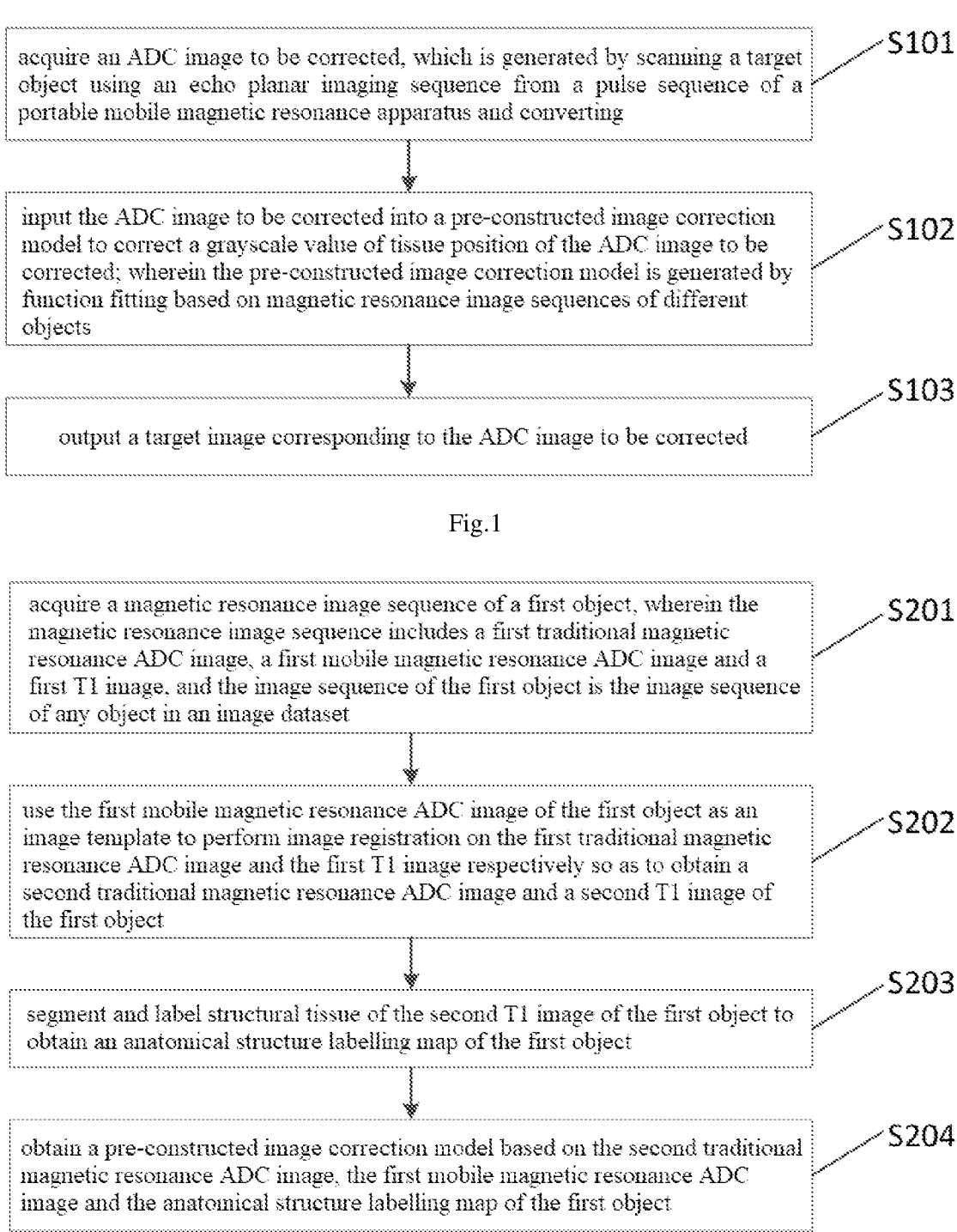

acquire an ADC image to be corrected, which is generated by scanning a target object using an echo planar imaging sequence from a pulse sequence of a portable mobile magnetic resonance apparatus and converting ⟋S101 input the ADC image to be corrected into a pre-constructed image correction model to correct a grayscale value of tissue position of the ADC image to be corrected; wherein the pre-constructed image correction model is generated by function fitting based on magnetic resonance image sequences of different objects ⟋S102 output a target image corresponding to the ADC image to be corrected ⟋S103

Fig.1 acquire a magnetic resonance image sequence of a first object, wherein the magnetic resonance image sequence includes a first traditional magnetic resonance ADC image, a first mobile magnetic resonance ADC image and a first T1 image, and the image sequence of the first object is the image sequence of any object in an image dataset ⟋S201 use the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object ⟋S202 segment and label structural tissue of the second T1 image of the first object to obtain an anatomical structure labelling map of the first object ⟋S203 obtain a pre-constructed image correction model based on the second traditional magnetic resonance ADC image, the first mobile magnetic resonance ADC image and the anatomical structure labelling map of the first object ⟋S204

Fig.2

METHOD AND DEVICE FOR CORRECTING MAGNETIC RESONANCE IMAGE, STORAGE MEDIUM, AND TERMINAL

TECHNICAL FIELD

The present disclosure relates to the technical field of image processing and the technical field of digital medical treatment, and in particular to a method for correcting magnetic resonance image, a device for correcting magnetic resonance image, a storage medium, and a terminal.

BACKGROUND

Acute ischemic stroke (AIS) patients often have the characteristics of acute onset, short treatment time window, and the need for imaging assistance in clinical decision-making. Portable Magnetic Resonance Imaging (pMRI) is widely used in the imaging examination of AIS patients due to its characteristics of small volume, light weight, and not being restricted to a fixed site.

The apparent diffusion coefficient (ADC) image in imaging examination can effectively reflect information such as the location and severity of the patient's infarct core. Such information plays a critical role in clinical diagnosis and treatment decision-making. Therefore, due to the advantage of high field strength, traditional fixed magnetic resonance imaging can use echo planar imaging sequence (EPI sequence) to generate diffusion weighted images (DWI) by scanning, so that ADC images are further calculated.

Compared to conventional fixed magnetic resonance imaging (cMRI) with a field strength of 1.5T or 3.0T, portable mobile magnetic resonance imaging mostly has a field strength below 1.0T. However, EPI sequences can only be used in conventional fixed magnetic resonance imaging with a field strength above 1.0T, and it is difficult for EPI sequences to be used in portable mobile magnetic resonance imaging with a field strength below 1.0T. Therefore, there is a certain disparity between the absolute value of the ADC image generated by portable mobile magnetic resonance imaging and the absolute value of the ADC image generated by conventional fixed magnetic resonance imaging. Therefore, correction of this disparity is what research and development personnel are eager to solve.

In the prior art, the correction mainly relies on the subjective experience of research and development personnel. By separately calibrating the absolute values of the grayscale values of the cerebrospinal fluid positions in conventional fixed magnetic resonance ADC images and portable mobile magnetic resonance ADC images, calculating a difference between the calibrated absolute values, and finally collectively adding the absolute values of portable mobile magnetic resonance ADC images with this difference, the disparity of portable mobile magnetic resonance ADC images is corrected. Since the currently artificially calibrated cerebrospinal fluid range differs greatly each time, the difference calculated each time is large, which reduces the parameter accuracy of portable mobile magnetic resonance ADC images.

SUMMARY

Embodiments of the present application provide a method for correcting magnetic resonance image, a device for correcting magnetic resonance image, a storage medium, and a terminal. In order to enable a basic understanding of some aspects of the disclosed embodiments, a brief summary is provided below. This summary is not a general description, nor is it intended to identify key/important constituent elements or describe the scope of protection of these embodiments. Its sole purpose is to present some concepts in a simple form as the preamble to the detailed description that follows.

In a first aspect, an embodiment of the present application provides a method for correcting magnetic resonance image, which includes:

acquiring an ADC image to be corrected, which is generated by scanning a target object using an echo planar imaging sequence from a pulse sequence of a portable mobile magnetic resonance apparatus and converting;

inputting the ADC image to be corrected into a pre-constructed image correction model to correct a grayscale value of tissue position of the ADC image to be corrected; where the pre-constructed image correction model is generated by function fitting based on magnetic resonance image sequences of different objects; and outputting a target image corresponding to the ADC image to be corrected.

Optionally, before acquiring the ADC image to be corrected obtained in advance through the portable mobile magnetic resonance apparatus, the method further includes:

acquiring a magnetic resonance image sequence of a first object, where the magnetic resonance image sequence includes a first traditional magnetic resonance ADC image, a first mobile magnetic resonance ADC image and a first T1 image, and the image sequence of the first object is the image sequence of any object in an image dataset;

using the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object;

segmenting and labelling structural tissue of the second T1 image of the first object to obtain an anatomical structure labelling map of the first object; and obtaining a pre-constructed image correction model based on the second traditional magnetic resonance ADC image, the first mobile magnetic resonance ADC image and the anatomical structure labelling map of the first object.

Optionally, the first traditional magnetic resonance ADC image is generated through a traditional fixed magnetic resonance apparatus, the first mobile magnetic resonance ADC image is generated through a portable mobile magnetic resonance apparatus, and the first T1 image is generated by scanning according to a target sequence from the pulse sequence of the traditional fixed magnetic resonance apparatus and converting.

Optionally, the obtaining a pre-constructed image correction model based on the second traditional magnetic resonance ADC image, the first mobile magnetic resonance ADC image and the anatomical structure labelling map of the first object includes:

loading a target parameter correction function predefined for the ADC image scanned and converted by the portable mobile magnetic resonance apparatus;

using image parameters of the second traditional magnetic resonance ADC image of the first object as a first variable of the target parameter correction function, using image parameters of the first mobile magnetic resonance ADC image as a second variable of the target parameter correction function, and using image parameters of the anatomical structure labelling map as a third variable of the target parameter correction function to obtain an image parameter expression of the first object; where the first variable is a corrected pADC image $IC_{pADC}$, the second variable is a pADC image to be corrected $I_{pADC}$, and the third variable is an anatomical structure segmentation class il;

performing function fitting based on the image parameter expression of the first object and the least square method to obtain an image correction function; and modeling based on the image correction function to obtain a pre-constructed image correction model.

Optionally, the target parameter correction function is:

$$f(x) = \sum_{i=0}^{N_f} a_i x^i = F(I_{pADC}(il, ix, iy));$$

$$IC_{pADC}(il, ix, iy) = F(I_{pADC}(il, ix, iy)), il \le N_{class}, 0 \le ix \le W, 0 \le iy \le H;$$

where $IC_{pADC}$ is the corrected pADC image, $I_{pADC}$ is the pADC image to be corrected, and il is the anatomical structure segmentation class; ix and iy are horizontal and vertical coordinates of each pixel position of the target tissue in the image respectively, $N_{class}$ is the number of anatomical structure segmentation class, and W, H are the width and height of the image respectively; x is the independent variable, i is the order of the polynomial function, $a_i$ is the coefficient of each order, and $N_f$ is the number of orders of the polynomial function.

Optionally, the using the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object includes:

using the first mobile magnetic resonance ADC image of the first object as the image template;

extracting first feature points in the first traditional magnetic resonance ADC image and the image template, and matching the first feature points to obtain first matching feature points of the image template and the first traditional magnetic resonance ADC image;

extracting second feature points in the first T1 image and the image template, and matching the second feature points to obtain second matching feature points of the image template and the first T1 image;

generating a second traditional magnetic resonance ADC image of the first object based on the first matching feature points; and generating a second T1 image of the first object based on the second matching feature points.

Optionally, the generating a second traditional magnetic resonance ADC image of the first object based on the first matching feature points includes:

using the first matching feature points as a constraint condition to deform the first traditional magnetic resonance ADC image so that the position of the deformed image is consistent with the position of the matching feature points of the image template, thus obtaining the second traditional magnetic resonance ADC image of the first object.

In a second aspect, an embodiment of the present application provides a device for correcting magnetic resonance image, which includes:

an image acquisition module, which is configured to acquire an ADC image to be corrected, which is generated by scanning using an echo planar imaging sequence from a pulse sequence of a portable mobile magnetic resonance apparatus and converting;

an image parameter correction module, which is configured to input the ADC image to be corrected into a pre-constructed image correction model to correct a grayscale value of tissue position of the ADC image to be corrected; where the pre-constructed image correction model is generated by function fitting based on magnetic resonance image sequences of different objects; and an image output module, which is configured to output a target image corresponding to the ADC image to be corrected.

In a third aspect, an embodiment of the present application provides a computer storage medium, on which multiple instructions suitable for being loaded by a processor to execute the above method steps are stored.

In a fourth aspect, an embodiment of the present application provides a terminal, which may include a processor and a memory; where computer programs are stored in the memory, and the computer programs are suitable for being loaded by the processor to execute the above method steps.

The technical solutions provided in the embodiments of the present application may have the following advantageous effects.

In the embodiments of the present application, the device for correcting magnetic resonance image first acquires an ADC image to be corrected, which is generated by scanning a target object using an echo planar imaging sequence from a pulse sequence of a portable mobile magnetic resonance apparatus and converting; then the ADC image to be corrected is input into a pre-constructed image correction model to correct a grayscale value of tissue position of the ADC image to be corrected, where the pre-constructed image correction model is generated by function fitting based on magnetic resonance image sequences of different objects; finally, a target image corresponding to the ADC image to be corrected is output. Since the pre-constructed image correction model is generated by function fitting based on magnetic resonance image sequences of different objects in the present application, the constant parameter of the model has a high credibility, so that the problem of low parameter credibility caused by correction based on artificial experience is avoided, thus improving the parameter accuracy of portable mobile magnetic resonance ADC images.

It should be understood that the above general description and the following detailed description are only illustrative and explanatory, and cannot limit the present disclosure.

BRIEF DESCRIPTION OF THE DRAWINGS

The accompanying drawings are herein incorporated into the specification and form a part of this specification; they illustrate embodiments in accordance with the present disclosure and are used together with the specification to explain the principles of the present disclosure.

FIG. 1 is a schematic flowchart of a method for correcting magnetic resonance image provided by an embodiment of the present application;

FIG. 2 is a schematic flowchart of constructing an image correction model provided by an embodiment of the present application;

DETAILED DESCRIPTION

Figure 3:
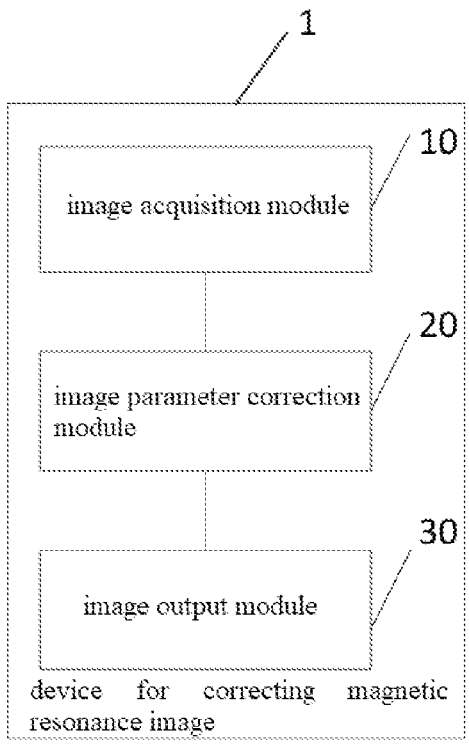
FIG. 3 is a schematic diagram of the structure of a device for correcting magnetic resonance image provided by an embodiment of the present application.

The following description and drawings fully illustrate the specific embodiments of the present disclosure to enable those skilled in the art to carry them out.

It should be noted that the described embodiments are only some of the embodiments of the present disclosure, not all of them. Based on the embodiments in the present disclosure, all the other embodiments obtained by those skilled in the art without creative effort will fall within the scope of protection of the present disclosure.

When the drawings are referred to in the following description, unless otherwise indicated, the same numbers in different drawings denote the same or similar elements. The implementations described in the following exemplary embodiments do not represent all implementations consistent with the present disclosure. On the contrary, they are only examples of the device and method that are consistent with some aspects of the present disclosure as detailed in the appended claims.

In the description of the present disclosure, it should be understood that terms "first", "second" and the like are only used for descriptive purpose and should not be understood as indicating or implying relative importance. For those skilled in the art, the specific meanings of the above terms in the present disclosure can be understood according to specific situations. Further, in the description of the present disclosure, unless otherwise specified, "multiple" refers to two or more. "and/or" describes the association relationship of the associated objects, indicating that there can be three types of relationships. For example, A and/or B can represent the following three situations: the existence of A alone, the coexistence of A and B, and the existence of B alone. The character "/" generally indicates that the associated objects in front of and behind "/" have an "or" relationship.

The present application provides a method for correcting magnetic resonance image, a device for correcting magnetic resonance image, a storage medium, and a terminal to solve the problems existing in the above related art. In the technical solutions provided in the present application, since the pre-constructed image correction model is generated by function fitting based on magnetic resonance image sequences of different objects in the present application, the constant parameter of the model has a high credibility, so that the problem of low parameter credibility caused by correction based on artificial experience is avoided, thus improving the parameter accuracy of portable mobile magnetic resonance ADC images. Exemplary embodiments will be used below for detailed description.

In the following, the method for correcting magnetic resonance image provided by an embodiment of the present application will be described in detail with reference to FIGS. 1 to 2. This method can be implemented through computer programs, or can be executed on a device for correcting magnetic resonance image, which is based on the von Neumann system. The computer programs can be integrated into an application, or run as an independent tool application.

Reference is made to FIG. 1, which is a schematic flowchart of the method for correcting magnetic resonance image provided by an embodiment of the present application. As shown in FIG. 1, the method of the embodiment of the present application may include the following steps S101 to S103.

S101: acquiring an ADC image to be corrected, which is generated by scanning a target object using an echo planar imaging sequence from a pulse sequence of a portable mobile magnetic resonance apparatus and converting;

where the portable mobile magnetic resonance apparatus is a small movable magnetic resonance imaging apparatus, with its field strength mostly below 1.0T, making it convenient to carry and move. The pulse sequence is an organic combination of radio frequency pulses and gradient pulses that are combined together in a certain time sequence during magnetic resonance imaging. The currently commonly used pulse sequences include spin echo sequence (SE), gradient echo sequence (GE), inversion recovery sequence (IR), fast spin echo sequence (FSE), and echo planar imaging sequence (EPI), etc.

In the embodiment of the present application, before acquiring the ADC image to be corrected, the target object is first scanned using the echo planar imaging sequence from the pulse sequence of the portable mobile magnetic resonance apparatus to obtain a diffusion weighted image (DWI) of the target object. Then, based on the diffusion weighted image (DWI) and in combination with the apparent diffusion coefficient for conversion, the ADC image to be corrected of the target object is obtained.

In a possible implementation, when correcting the ADC image to be corrected of the target object, the user's terminal first acquires the ADC image to be corrected of the target object.

S102: inputting the ADC image to be corrected into a pre-constructed image correction model to correct a grayscale value of tissue position of the ADC image to be corrected; where the pre-constructed image correction model is generated by function fitting based on magnetic resonance image sequences of different objects;

in the embodiment of the present application, when generating the pre-constructed image correction model, a magnetic resonance image sequence of a first object is acquired first, where the magnetic resonance image sequence includes a first traditional magnetic resonance ADC image, a first mobile magnetic resonance ADC image and a first T1 image, and the image sequence of the first object is the image sequence of any object in an image dataset; then the first mobile magnetic resonance ADC image of the first object is used as an image template to perform image registration on the first traditional magnetic resonance ADC image and the first T1 image respectively so as to obtain a second traditional magnetic resonance ADC image and a second T1 image of the first object; next, structural tissue of the second T1 image of the first object is segmented and labelled to obtain an anatomical structure labelling map of the first object; and finally, a pre-constructed image correction model is obtained based on the second traditional magnetic resonance ADC image, the first mobile magnetic resonance ADC image and the anatomical structure labelling map of the first object.

In a possible implementation, after obtaining the ADC image to be corrected, the user's terminal can input the ADC image to be corrected into the pre-constructed image correction model to correct the grayscale value of tissue position of the ADC image to be corrected and obtain a target image corresponding to the ADC image to be corrected.

S103: outputting a target image corresponding to the ADC image to be corrected.

In the embodiment of the present application, after obtaining the target image corresponding to the ADC image to be corrected, the user's terminal can output the target image corresponding to the ADC image to be corrected.

In the embodiment of the present application, the device for correcting magnetic resonance image first acquires an ADC image to be corrected, which is generated by scanning a target object using an echo planar imaging sequence from a pulse sequence of a portable mobile magnetic resonance apparatus and converting; then the ADC image to be corrected is input into a pre-constructed image correction model to correct a grayscale value of tissue position of the ADC image to be corrected, where the pre-constructed image correction model is generated by function fitting based on magnetic resonance image sequences of different objects; finally, a target image corresponding to the ADC image to be corrected is output. Since the pre-constructed image correction model is generated by function fitting based on magnetic resonance image sequences of different objects in the present application, the constant parameter of the model has a high credibility, so that the problem of low parameter credibility caused by correction based on artificial experience is avoided, thus improving the parameter accuracy of portable mobile magnetic resonance ADC images.

Reference is made to FIG. 2, which is a schematic flowchart of constructing an image correction model provided by an embodiment of the present application. As shown in FIG. 2, the method of the embodiment of the present application may include the following steps S201 to S204.

S201: acquiring a magnetic resonance image sequence of a first object, where the magnetic resonance image sequence includes a first traditional magnetic resonance ADC image, a first mobile magnetic resonance ADC image and a first T1 image, and the image sequence of the first object is the image sequence of any object in an image dataset;

where the first traditional magnetic resonance ADC image is generated through a traditional fixed magnetic resonance apparatus, the first mobile magnetic resonance ADC image is generated through a portable mobile magnetic resonance apparatus, and the first T1 image is generated by scanning according to a target sequence from the pulse sequence of the traditional fixed magnetic resonance apparatus and converting.

In the embodiment of the present application, when obtaining the image dataset, a single traditional magnetic resonance ADC image, a single mobile magnetic resonance ADC image and a single T1 image of each of n target objects are first collected to construct an image dataset D, where the optimal value of n is 100, but n is not limited to this value.

In a possible implementation, the user's terminal first acquires the image sequence of any object in the image dataset to obtain the magnetic resonance image sequence of the first object.

S202: using the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object;

where the image registration is a process of matching and overlaying two or more images acquired at different times with different imaging devices or under different conditions.

In the embodiment of the present application, when performing image registration, the first mobile magnetic resonance ADC image of the first object is used as the image template; then first feature points in the first traditional magnetic resonance ADC image and the image template are extracted, and the first feature points are matched to obtain first matching feature points of the image template and the first traditional magnetic resonance ADC image; next, second feature points in the first T1 image and the image template are extracted, and the second feature points are matched to obtain second matching feature points in the image template and the first T1 image; then a second traditional magnetic resonance ADC image of the first object is generated based on the first matching feature points; and finally, a second T1 image of the first object is generated based on the second matching feature points.

Specifically, when generating the second traditional magnetic resonance ADC image of the first object based on the first matching feature points, the first matching feature points are used as a constraint condition to deform the first traditional magnetic resonance ADC image so that the position of the deformed image is consistent with the position of the matching feature points of the image template, thus obtaining the second traditional magnetic resonance ADC image of the first object.

Specifically, when generating the second T1 image of the first object based on the second matching feature points, the second matching feature points are used as a constraint condition to deform the first T1 image so that the position of the deformed image is consistent with the position of the matching feature points of the image template, thus obtaining the second T1 image of the first object.

It should be noted that the optimal setting for the template image is the mobile magnetic resonance ADC image, but it is not limited to this image. The optimal registration method is rigid registration, but it is not limited to this method.

S203: segmenting and labelling structural tissue of the second T1 image of the first object to obtain an anatomical structure labelling map of the first object;

in the embodiment of the present application, the structural tissue of the second T1 image of the first object is segmented and labeled, where the optimal method for tissue segmentation is the kmeans segmentation method, and the optimal number $N_{class}$ of anatomical structure segmentation classes is 3 (including cerebrospinal fluid, cerebra gray matter, and cerebra white matter); the anatomical structure labelling map L is obtained (in the anatomical structure labelling map L, the optimal labelling can be set as: background being labelled as 0, the cerebrospinal fluid being labelled as 1, the cerebra gray matter being labelled as 2, and the cerebra white matter being labelled as 3); after the labelling is completed, the anatomical structure labelling map of the first object is obtained.

S204: obtaining a pre-constructed image correction model based on the second traditional magnetic resonance ADC image, the first mobile magnetic resonance ADC image and the anatomical structure labelling map of the first object.

In the embodiment of the present application, when obtaining the pre-constructed image correction model based on the second traditional magnetic resonance ADC image, the first mobile magnetic resonance ADC image and the anatomical structure labelling map of the first object, a target parameter correction function predefined for the ADC image scanned and converted by the portable mobile magnetic resonance apparatus is loaded first; then image parameters of the second traditional magnetic resonance ADC image of the first object are used as a first variable of the target parameter correction function, image parameters of the first mobile magnetic resonance ADC image are used as a second variable of the target parameter correction function, and image parameters of the anatomical structure labelling map are used as a third variable of the target parameter correction function to obtain an image parameter expression of the first object; where the first variable is a corrected pADC image $IC_{pADC}$, the second variable is a pADC image to be corrected $I_{pADC}$, and the third variable is an anatomical structure segmentation class il; next, function fitting is performed based on the image parameter expression of the first object and the least square method to obtain an image correction function; and finally, modeling is performed based on the image correction function to obtain a pre-constructed image correction model.

Specifically, the target parameter correction function is:

$$f(x) = \sum_{i=0}^{N_f} a_i x^i = F(I_{pADC}(il, ix, iy));$$

$$IC_{pADC}(il, ix, iy) = F(I_{pADC}(il, ix, iy)), il \le N_{class}, 0 \le ix \le W, 0 \le iy \le H;$$

where $IC_{pADC}$ is the corrected pADC image, $I_{pADC}$ is the pADC image to be corrected, and il is the anatomical structure segmentation class; ix and iy are horizontal and vertical coordinates of each pixel position of the target tissue in the image respectively, $N_{class}$ is the number of anatomical structure segmentation class, and W, H are the width and height of the image respectively; x is the independent variable, i is the order of the polynomial function, $a_i$ is the coefficient of each order, and $N_f$ is the number of orders of the polynomial function.

For example, after the target parameter correction function is obtained, the image parameters of the second traditional magnetic resonance ADC image of the first object are first used as the corrected pADC image $IC_{pADC}$ in this function; then, the image parameters of the first mobile magnetic resonance ADC image are used as the pADC image to be corrected $I_{pADC}$ in this function; next, the image parameters of the anatomical structure labelling map L are used as the structure segmentation class in this function; and finally, the least square method is used to fit the function f(x) to solve for the constant parameter $a_i$ in this function to finally obtain the fitted correction function $F_{fit}(x)$.

After the correction function $F_{fit}(x)$ is obtained, the user's terminal can correct any ADC image to be corrected in combination with the correction function $I_{fit}(x)$, so as to obtain the corrected image $IC_{pADC}$.

In the embodiment of the present application, the device for correcting magnetic resonance image first acquires an ADC image to be corrected, which is generated by scanning a target object using an echo planar imaging sequence from a pulse sequence of a portable mobile magnetic resonance apparatus and converting; then the ADC image to be corrected is input into a pre-constructed image correction model to correct a grayscale value of tissue position of the ADC image to be corrected, where the pre-constructed image correction model is generated by function fitting based on magnetic resonance image sequences of different objects; finally, a target image corresponding to the ADC image to be corrected is output. Since the pre-constructed image correction model is generated by function fitting based on magnetic resonance image sequences of different objects in the present application, the constant parameter of the model has a high credibility, so that the problem of low parameter credibility caused by correction based on artificial experience is avoided, thus improving the parameter accuracy of portable mobile magnetic resonance ADC images.

The following is a device embodiment of the present disclosure, which can be used to carry out the method embodiment of the present disclosure. For details not disclosed in the device embodiment of the present disclosure, reference may be made to the method embodiment of the present disclosure.

Reference is made to FIG. 3, which is a schematic diagram of the structure of a device for correcting magnetic resonance image provided by an illustrative embodiment of the present disclosure. The device for correcting magnetic resonance image can be realized as the entirety or part of a terminal through software, hardware, or a combination of both software and hardware. The device 1 includes an image acquisition module 10, an image parameter correction module 20, and an image output module 30.

The image acquisition module 10 is configured to acquire an ADC image to be corrected, which is generated by scanning using an echo planar imaging sequence from a pulse sequence of a portable mobile magnetic resonance apparatus and converting;

the image parameter correction module 20 is configured to input the ADC image to be corrected into a pre-constructed image correction model to correct a grayscale value of tissue position of the ADC image to be corrected; where the pre-constructed image correction model is generated by function fitting based on magnetic resonance image sequences of different objects; and the image output module 30 is configured to output a target image corresponding to the ADC image to be corrected.

It should be noted that the device for correcting magnetic resonance image provided by the above embodiment is only described exemplarily with the division of the above various functional modules when executing the method for correcting magnetic resonance image. In practical applications, the above functions can be assigned to different functional modules as needed, that is, the internal structure of the device can be divided into different functional modules to complete all or part of the functions described above. In addition, the device for correcting magnetic resonance image provided by the above embodiment belongs to the same concept as the embodiment of the method for correcting magnetic resonance image. For details of the implementation process thereof, reference may be made to the method embodiment, and a repeated description will be omitted herein.

The numbering of the above embodiments is only for descriptive purpose, and do not represent the advantages or disadvantages of the embodiments.

In the embodiment of the present application, the device for correcting magnetic resonance image first acquires an ADC image to be corrected, which is generated by scanning a target object using an echo planar imaging sequence from a pulse sequence of a portable mobile magnetic resonance apparatus and converting; then the ADC image to be corrected is input into a pre-constructed image correction model to correct a grayscale value of tissue position of the ADC image to be corrected, where the pre-constructed image correction model is generated by function fitting based on magnetic resonance image sequences of different objects; finally, a target image corresponding to the ADC image to be corrected is output. Since the pre-constructed image correction model is generated by function fitting based on magnetic resonance image sequences of different objects in the present application, the constant parameter of the model has a high credibility, so that the problem of low parameter credibility caused by correction based on artificial experience is avoided, thus improving the parameter accuracy of portable mobile magnetic resonance ADC images.

The present disclosure also provides a computer-readable medium on which program instructions are stored. When the program instructions are executed by a processor, the method for correcting magnetic resonance image provided by the above method embodiments is implemented.

The present disclosure also provides a computer program product containing instructions; when the instructions are running on a computer, the computer executes the method for correcting magnetic resonance image provided by the above method embodiments.

Figure 4:
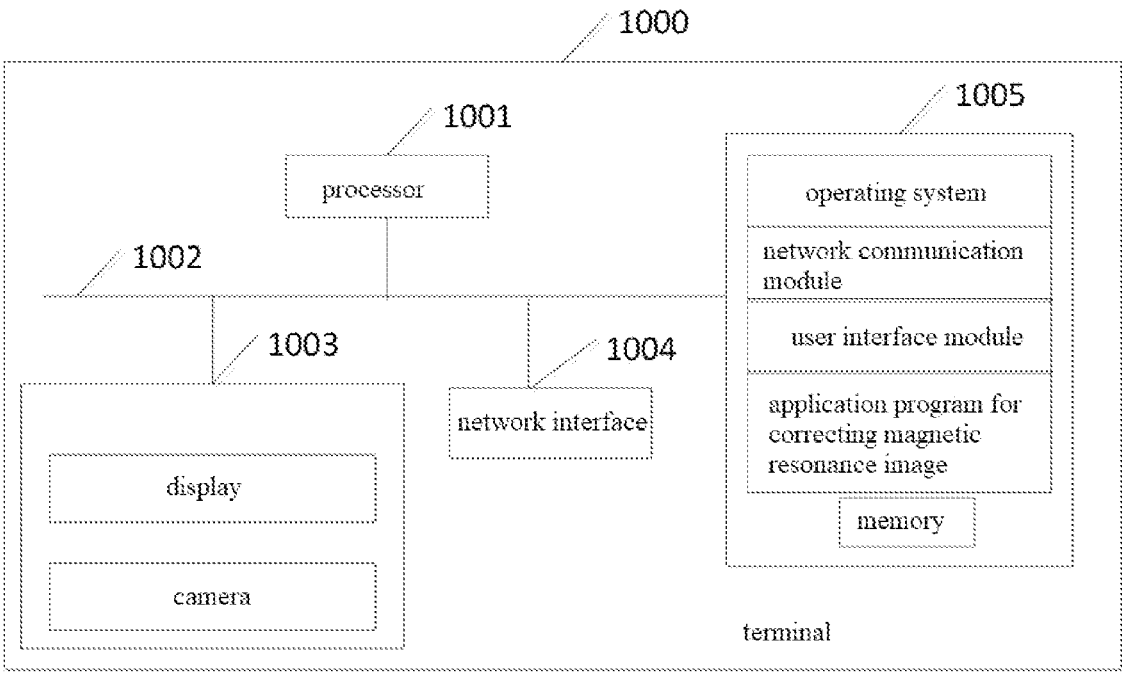
FIG. 4 is a schematic diagram of the structure of a terminal provided by an embodiment of the present application.

Reference is made to FIG. 4, which is a schematic diagram of the structure of a terminal provided by an embodiment of the present application. As shown in FIG. 4, the terminal 1000 may include: at least one processor 1001, at least one network interface 1004, a user interface 1003, a memory 1005, and at least one communication bus 1002.

The communication bus 1002 is configured to achieve connection communication between these assemblies.

The user interface 1003 may include a display and a camera; optionally, the user interface 1003 may also include standard wired interfaces and wireless interfaces.

Optionally, the network interface 1004 may include standard wired interfaces and wireless interfaces (such as WI-FI interfaces).

The processor 1001 may include one or more processing cores. The processor 1001 connects various parts of the entire electronic device 1000 through various interfaces and lines, executes various functions of the electronic device 1000 and processes data by running or executing instructions, programs, code sets or instruction sets stored in the memory 1005 and calling data stored in the memory 1005. Optionally, the processor 1001 can be implemented in at least one hardware form of Digital Signal Processing (DSP), Field-Programmable Gate Array (FPGA) and Programmable Logic Array (PLA). The processor 1001 may have a combination of one or more of Central Processing Unit (CPU), Graphics Processing Unit (GPU) and modem integrated therein. The CPU mainly handles the operating system, user interfaces, and application programs, etc.; the GPU is responsible for rendering and drawing the content that needs to be displayed on the display; and the modem is configured to handle wireless communication. It can be understood that the above-mentioned modem can also be implemented separately through a single chip without being integrated into the processor 1001.

The memory 1005 may include a Random Access Memory (RAM) or a Read-Only Memory. Optionally, the memory 1005 includes a non-transitory computer-readable storage medium. The memory 1005 can be used to store instructions, programs, codes, code sets, or instruction sets. The memory 1005 may include a storage program area and a storage data area, where the storage program area may store instructions for implementing the operating system, instructions for at least one function (such as touch function, sound playing function, image playing function, etc.), instructions for implementing the above method embodiments, etc.; the storage data area can store the data involved in the above various method embodiments. Optionally, the memory 1005 can also be at least one storage device located away from the aforementioned processor 1001. As shown in FIG. 4, the memory 1005 as a computer storage medium may include an operating system, a network communication module, a user interface module, and an application program for correcting magnetic resonance image.

In the terminal 1000 shown in FIG. 4, the user interface 1003 is mainly used to provide an interface for inputting by users, so as to obtain the data input by users; and the processor 1001 can be used to call the application program for correcting magnetic resonance image stored in the memory 1005, and specifically perform the following operations:

acquiring an ADC image to be corrected, which is generated by scanning a target object using an echo planar imaging sequence from a pulse sequence of a portable mobile magnetic resonance apparatus and converting;

inputting the ADC image to be corrected into a pre-constructed image correction model to correct a gray-scale value of tissue position of the ADC image to be corrected; where the pre-constructed image correction model is generated by function fitting based on magnetic resonance image sequences of different objects; and outputting a target image corresponding to the ADC image to be corrected.

In an embodiment, the processor 1001 further performs the following operations:

acquiring a magnetic resonance image sequence of a first object, where the magnetic resonance image sequence includes a first traditional magnetic resonance ADC image, a first mobile magnetic resonance ADC image and a first T1 image, and the image sequence of the first object is the image sequence of any object in an image dataset;

using the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object;

segmenting and labelling structural tissue of the second T1 image of the first object to obtain an anatomical structure labelling map of the first object; and obtaining a pre-constructed image correction model based on the second traditional magnetic resonance ADC image, the first mobile magnetic resonance ADC image and the anatomical structure labelling map of the first object.

In an embodiment, the processor 1001 specifically performs the following operations when obtaining the pre-constructed image correction model based on the second traditional magnetic resonance ADC image, the first mobile magnetic resonance ADC image and the anatomical structure labelling map of the first object:

loading a target parameter correction function predefined for the ADC image scanned and converted by the portable mobile magnetic resonance apparatus;

using image parameters of the second traditional magnetic resonance ADC image of the first object as a first variable of the target parameter correction function, using image parameters of the first mobile magnetic resonance ADC image as a second variable of the target parameter correction function, and using image parameters of the anatomical structure labelling map as a third variable of the target parameter correction function to obtain an image parameter expression of the first object; where the first variable is a corrected pADC image $IC_{pADC}$, the second variable is a pADC image to be corrected $I_{pADC}$, and the third variable is an ana-
tomical structure segmentation class il;
performing function fitting based on the image parameter
expression of the first object and the least square
method to obtain an image correction function; and
modeling based on the image correction function to obtain
a pre-constructed image correction model.

In an embodiment, the processor 1001 specifically per-
forms the following operations when using the first mobile
magnetic resonance ADC image of the first object as the
image template to perform image registration on the first
traditional magnetic resonance ADC image and the first T1
image respectively so as to obtain the second traditional
magnetic resonance ADC image and the second T1 image of
the first object:

using the first mobile magnetic resonance ADC image of
the first object as the image template;
extracting first feature points in the first traditional mag-
netic resonance ADC image and the image template,
and matching the first feature points to obtain first
matching feature points of the image template and the
first traditional magnetic resonance ADC image;
extracting second feature points in the first T1 image and
the image template, and matching the second feature
points to obtain second matching feature points of the
image template that corresponds to the first T1 image;
generating a second traditional magnetic resonance ADC
image of the first object based on the first matching
feature points; and
generating a second T1 image of the first object based on
the second matching feature points.

In an embodiment, the processor 1001 specifically per-
forms the following operation when generating the second
traditional magnetic resonance ADC image of the first object
based on the first matching feature points:

using the first matching feature points as a constraint
condition to deform the first traditional magnetic reso-
nance ADC image so that the position of the deformed
image is consistent with the position of the matching
feature points of the image template, thus obtaining the
second traditional magnetic resonance ADC image of
the first object.

In the embodiment of the present application, the device
for correcting magnetic resonance image first acquires an
ADC image to be corrected, which is generated by scanning
a target object using an echo planar imaging sequence from
a pulse sequence of a portable mobile magnetic resonance
apparatus and converting; then the ADC image to be cor-
rected is input into a pre-constructed image correction model
to correct a grayscale value of tissue position of the ADC
image to be corrected, where the pre-constructed image
correction model is generated by function fitting based on
magnetic resonance image sequences of different objects;
finally, a target image corresponding to the ADC image to be
corrected is output. Since the pre-constructed image correc-
tion model is generated by function fitting based on mag-
netic resonance image sequences of different objects in the
present application, the constant parameter of the model has
a high credibility, so that the problem of low parameter
credibility caused by correction based on artificial experi-
ence is avoided, thus improving the parameter accuracy of
portable mobile magnetic resonance ADC images.

It can be understood by those skilled in the art that the
implementation of all or part of the processes in the above
method embodiments can be completed by instructing rel-
evant hardware through computer programs. The program
for correcting magnetic resonance image can be stored in a computer-readable storage medium, and the program may
include processes of the above method embodiments when
executed. The storage medium for the program for correct-
ing magnetic resonance image can be a magnetic disk, an
optical disc, a read-only storage memory, or a random
storage memory, etc.

Described above are only preferred embodiments of the
present application, and of course, they cannot be used to
limit the scope of claims of the present application. There-
fore, equivalent changes made according to the claims of the
present application still fall within the scope covered by the
present application.

The invention claimed is:

1. A method for correcting magnetic resonance image,
comprising:

acquiring an Apparent Diffusion Coefficient (ADC) image
to be corrected, which is generated by scanning a target
object using an echo planar imaging sequence from a
pulse sequence of a portable mobile magnetic reso-
nance apparatus and converting;
inputting the ADC image to be corrected into a pre-
constructed image correction model to correct a gray-
scale value of tissue position of the ADC image to be
corrected; wherein the pre-constructed image correc-
tion model is generated by function fitting based on
magnetic resonance image sequences of different
objects; and
outputting a target image corresponding to the ADC
image to be corrected,
wherein before acquiring the ADC image to be corrected,
the method further comprises:
acquiring a magnetic resonance image sequence of a first
object, wherein the magnetic resonance image
sequence comprises a first traditional magnetic reso-
nance ADC image, a first mobile magnetic resonance
ADC image and a first T1 image, and the image
sequence of the first object is the image sequence of any
object in an image dataset;
using the first mobile magnetic resonance ADC image of
the first object as an image template to perform image
registration on the first traditional magnetic resonance
ADC image and the first T1 image respectively so as to
obtain a second traditional magnetic resonance ADC
image and a second T1 image of the first object;
segmenting and labelling structural tissue of the second
T1 image of the first object to obtain an anatomical
structure labelling map of the first object; and
obtaining the pre-constructed image correction model
based on the second traditional magnetic resonance
ADC image, the first mobile magnetic resonance ADC
image and the anatomical structure labelling map of the
first object.

2. The method according to claim 1, wherein the first
traditional magnetic resonance ADC image is generated
through a traditional fixed magnetic resonance apparatus,
the first mobile magnetic resonance ADC image is generated
through a portable mobile magnetic resonance apparatus,
and the first T1 image is generated by scanning according to
a target sequence from the pulse sequence of the traditional
fixed magnetic resonance apparatus and converting.

3. The method according to claim 1, wherein the obtaining
a pre-constructed image correction model based on the
second traditional magnetic resonance ADC image, the first
mobile magnetic resonance ADC image and the anatomical
structure labelling map of the first object comprises:

loading a target parameter correction function predefined for the ADC image scanned and converted by the portable mobile magnetic resonance apparatus;

using image parameters of the second traditional magnetic resonance ADC image of the first object as a first variable of the target parameter correction function, using image parameters of the first mobile magnetic resonance ADC image as a second variable of the target parameter correction function, and using image parameters of the anatomical structure labelling map as a third variable of the target parameter correction function to obtain an image parameter expression of the first object; wherein the first variable is a corrected pADC image $IC_{pADC}$, the second variable is a pADC image to be corrected $I_{pADC}$, and the third variable is an anatomical structure segmentation class il;

performing function fitting based on the image parameter expression of the first object and the least square method to obtain an image correction function; and modeling based on the image correction function to obtain a pre-constructed image correction model.

4. The method according to claim 3, wherein the target parameter correction function is:

$$f(x) = \sum_{i=0}^{N_f} a_i x^i = F(I_{pADC}(il, ix, iy));$$

$$IC_{pADC}(il, ix, iy) = F(I_{pADC}(il, ix, iy)), il \leq N_{class}, 0 \leq ix \leq W, 0 \leq iy \leq H;$$

where $IC_{pADC}$ is the corrected pADC image, $I_{pADC}$ is the pADC image to be corrected, and il is the anatomical structure segmentation class; ix and iy are horizontal and vertical coordinates of each pixel position of the target tissue in the image respectively, $N_{class}$ is the number of anatomical structure segmentation class, and W, H are the width and height of the image respectively; x is the independent variable, i is the order of the polynomial function, $a_i$ is the coefficient of each order, and $N_f$ is the number of orders of the polynomial function.

5. The method according to claim 1, wherein the using the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object comprises:

using the first mobile magnetic resonance ADC image of the first object as the image template;

extracting first feature points in the first traditional magnetic resonance ADC image and the image template, and matching the first feature points to obtain first matching feature points of the image template and the first traditional magnetic resonance ADC image;

extracting second feature points in the first T1 image and the image template, and matching the second feature points to obtain second matching feature points of the image template and the first T1 image;

generating a second traditional magnetic resonance ADC image of the first object based on the first matching feature points; and generating a second T1 image of the first object based on the second matching feature points.

6. The method according to claim 5, wherein the generating a second traditional magnetic resonance ADC image of the first object based on the first matching feature points comprises:

using the first matching feature points as a constraint condition to deform the first traditional magnetic resonance ADC image so that the position of the deformed image is consistent with the position of the matching feature points of the image template, thus obtaining the second traditional magnetic resonance ADC image of the first object.

7. A device for correcting magnetic resonance image, comprising:

an image acquisition module, which is configured to acquire an Apparent Diffusion Coefficient (ADC) image to be corrected, which is generated by scanning using an echo planar imaging sequence from a pulse sequence of a portable mobile magnetic resonance apparatus and converting;

an image parameter correction module, which is configured to input the ADC image to be corrected into a pre-constructed image correction model to correct a grayscale value of tissue position of the ADC image to be corrected; wherein the pre-constructed image correction model is generated by function fitting based on magnetic resonance image sequences of different objects; and an image output module, which is configured to output a target image corresponding to the ADC image to be corrected;

wherein the device is configured to:

acquire a magnetic resonance image sequence of a first object, wherein the magnetic resonance image sequence comprises a first traditional magnetic resonance ADC image, a first mobile magnetic resonance ADC image and a first T1 image, and the image sequence of the first object is the image sequence of any object in an image dataset;

use the first mobile magnetic resonance ADC image of the first object as an image template to perform image registration on the first traditional magnetic resonance ADC image and the first T1 image respectively so as to obtain a second traditional magnetic resonance ADC image and a second T1 image of the first object;

segment and label structural tissue of the second T1 image of the first object to obtain an anatomical structure labelling map of the first object; and obtain the pre-constructed image correction model based on the second traditional magnetic resonance ADC image, the first mobile magnetic resonance ADC image and the anatomical structure labelling map of the first object.

8. A terminal, comprising a processor and a memory; wherein computer programs are stored in the memory, and the computer programs are suitable for being loaded by the processor to execute the method according to claim 1.

* * * * *